United States Patent [19]

Matsuo

[11] Patent Number: 4,776,034

[45] Date of Patent: Oct. 4, 1988

[54] RADIO COMMUNICATION SYSTEM OPERABLE IN COOPERATION WITH A VOX SYSTEM

[75] Inventor: Yoshitake Matsuo, Tokyo, Japan

[73] Assignee: NEC Corporation, Tokyo, Japan

[21] Appl. No.: 53,530

[22] Filed: May 22, 1987

Related U.S. Application Data

[63] Continuation of Ser. No. 675,367, Nov. 27, 1984, abandoned.

[30] Foreign Application Priority Data

Nov. 28, 1983 [JP] Japan .................. 58-223982

[51] Int. Cl.$^4$ .................. H04B 1/00; H04Q 7/00
[52] U.S. Cl. .................. 455/54; 455/35; 340/825.48
[58] Field of Search .................. 455/34, 35, 38, 54, 455/228, 117, 79, 155; 340/825.48; 379/59

[56] References Cited

U.S. PATENT DOCUMENTS

| | | | |
|---|---|---|---|
| 2,974,221 | 3/1961 | Peth | 455/35 |
| 3,397,401 | 8/1968 | Winterbottom | 455/35 |
| 3,526,838 | 9/1970 | Banick | 455/155 |
| 4,501,017 | 2/1985 | Higgins et al. | 455/35 |
| 4,613,859 | 9/1986 | Mori | 455/38 |
| 4,628,537 | 12/1986 | Shimakata | 455/34 |
| 4,654,867 | 3/1987 | Labedz et al. | 455/54 |

Primary Examiner—Robert L. Griffin
Assistant Examiner—Curtis A. Kuntz
Attorney, Agent, or Firm—Sughrue, Mion, Zinn, Macpeak & Seas

[57] ABSTRACT

In a radio communication system, a mobile station (11) includes a detecting circuit (16) for producing a detection signal during presence of an audio signal, a producing circuit (31) for delivering a predetermined coded data signal to an audio signal circuit (14) and for supplying a duration signal to a power unit (17) at the end of the detection signal. The power unit disables the transmitting circuit during absence of the detection signal and the duration signal. The transmitting circuit transmits a transmission radio signal modulated by the audio signal and the predetermined coded data signal. A fixed station (12) comprises a separating circuit (44) for separating a reproduction of the predetermined coded data signal from a reproduction of the audio signal. A discriminating circuit (45) discriminates the reproduction of the predetermined coded data signal. Consequently, the fixed station is able to discriminate between presence and absence of the audio signal.

6 Claims, 1 Drawing Sheet

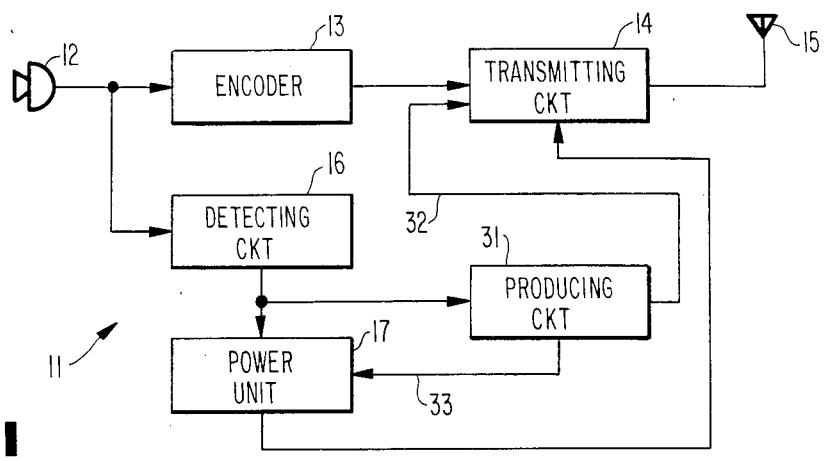
FIG 1
FIG.2A
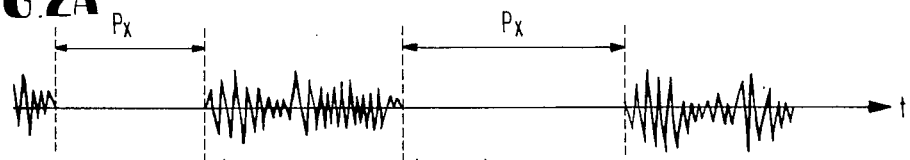
FIG.2B
FIG.2C
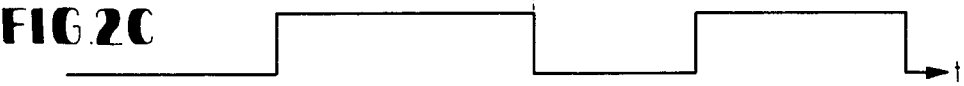
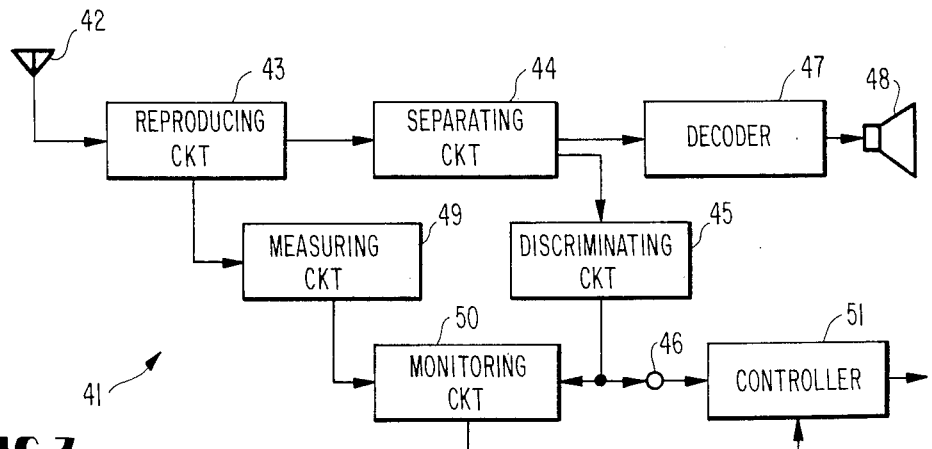
FIG 3

RADIO COMMUNICATION SYSTEM OPERABLE IN COOPERATION WITH A VOX SYSTEM

This is a continuation of application Ser. No. 675,367, filed Nov. 27, 1984, now abandoned.

BACKGROUND OF THE INVENTION

This invention relates to a radio communication system comprising a fixed station and a mobile station.

The fixed station has a service area and is assigned a predetermined number of radio channels. At least one mobile station, such as a portable radio telephone set, is movable in the service area. Some of such mobile stations may be carrying out radio communications with the fixed station, through some of the radio channels. When a particular mobile station goes off-hook to request a call service, the fixed station selects one of the vacant radio channels and allots this particular channel to the particular mobile station. Through this channel, the mobile station sends an audio signal to the fixed station in the manner which will presently be described.

Each mobile statio comprises a transmitting circuit and a power unit for controllably supplying electric power to the transmitting circuit and other parts of the mobile station. In the mobile station, the transmitting circuit produces a transmission radio signal on the particular channel with the transmission radio signal modulated by the audio signal.

The power unit is restricted in size and weight. It is therefore desirable to employ a power savings system in the power unit. A typical power saving system is the VOX (voice operated transmitter keyer system). In this connection, it may be mentioned here that the audio signal includes a certain number of pauses. The audio signal therefore comprises an audio signal portion between two adjacent pauses. The audio signal piece will herein be referred to as an audio signal. The VOX system comprises a detector for detecting the audio signal to produce a detection signal which lasts during the presence of the audio signal and consequently has a beginning and an end. The power unit enables the transmitting circuit in response to the detection signal and disables the same during the absence of the detection signal, namely, at each pause.

The fixed station comprises a receiving circuit for receiving the transmission radio signal as a reception radio signal. The receiving circuit holds open the particular channel throughout the aforementioned pauses until the mobile station goes on-hook.

In another conventional radio communication system, the fixed station measures the field intensity of the received radio signal from each radio channel. However, a given mobile station may move far away from the fixed station and the field intensity may be reduced. In the manner described above, a specific channel would continue to be allotted to the such a mobile station. Since the fixed station is provided; with only a limited number of radio channels, it is desirable for effective use of the radio channels to regard a given channel as a vacant radio channel when the field intensity decreases below a predetermined threshold level.

When the last-mentioned system is combined with the VOX system, a problem arises in that the field intensity of the particular channel decreases below the predetermined threshold level at each pause. Thus, the fixed station would regard the channel as vacant despite the fact that the channel should be held open for an audio signal carried on the channel after the pause.

SUMMARY OF THE INVENTION

It is therefore an object of this invention to provide the radio communication system wherein a fixed station is able to discriminate whether the transmitting circuit of the mobile station is disabled by a VOX system.

It is another object of this invention to provide a mobile station for use in the above-described radio communication system.

It is a further object of this invention to provide a fixed station for use in combination with the above-described mobile station.

Other objects of this invention will become clear from the following description.

The radio communication system according to this invention comprises a mobile station and a fixed station for transmitting and receiving a transmission and a reception radio signal. The mobile station comprises a transmitting circuit, detecting means for detecting an audio signal and producing a detection signal which lasts during the presence of the audio signal and consequently has a beginning and an end, and enabling means coupled to the detecting means for enabling the transmitting circuit in response to the detection signal, to make the transmission radio signal carry the audio signal. The fixed station comprises processing means for processing the reception radio signal to generate a first reproduction of the audio signal. The mobile station further comprises producing means responsive to the detection signal for producing a predetermined coded data signal at the end of the detection signal, and delivering means for delivering the predetermined coded data signal to the transmitting circuit to make the transmission radio signal further carry the predetermined coded data signal. The processing means comprises reproducing means responsive to the reception radio signal for reproducing the first reproduction of the audio signal and a second reproduction of the predetermined coded data signal, and separating means for separating the second reproduction from the first reproduction.

BRIEF DESCRIPTION OF THE DRAWING

FIG. 1 is a block diagram of a mobile station according to an embodiment of this invention;

FIGS. 2A, 2B and 2C show wave forms for use in describing operation of the mobile station illustrated in FIG. 1; and FIG. 3, drawn below FIG. 1, is a block diagram of a fixed station for use in combination with the mobile station depicted in FIG. 1.

DESCRIPTION OF THE PREFERRED EMBODIMENTS

A radio communication system according to a first embodiment of this invention comprises a mobile station and a fixed station for transmitting and receiving a transmission and a reception radio signal, respectively. The fixed station has a service area and is assigned a predetermined number of radio channels.

Referring to FIG. 1, the mobile station is indicated at 11 and comprises a microphone 12 for converting the voice of a speaker into an audio signal, and an encoder 13 for encoding the audio signal into a coded audio signal, such as a pulse code modulated signal or the like. Responsive to the encoded audio signal, a transmitting circuit 14 produces a modulated radio frequency signal. A transmission antenna 15 sends the modulated radio frequency signal to the fixed station as the above-mentioned transmission radio signal in the manner known in the art.

Like in the VOX system mentioned previously, a detecting circuit 16 detects the audio signal and produces a detection signal which lasts during the presence of the audio signal as will presently be described in more detail. At any rate, the detection signal has a beginning and an end. Responsive to the detection signal, a power unit 17 enables the transmitting circuit 14. The transmitting circuit 14 thereby produces the modulated radio frequency signal. In other words, the transmission radio signal is made to carry the audio signal.

Turning to FIG. 2A, the audio signal is produced in succession in the manner depicted in a zigzag waveform along the top line. A pause $P_x$ is interposed between two adjacent audio signals. The pause $P_x$ has a pause duration which varies dependent on the circumstances. The detection circuit 16 (FIG. 1) compares the audio signal with a predetermined threshold level to produce the detection signal, as shown in FIG. 2B. More particularly, the detection signal has a beginning and end which lag the transitions of the audio signal by first and second predetermined durations $t_1$ and $t_2$, respectively. the durations $t_1$ and $t_2$ are dependent on the response time of the detection circuit 16.

Referring now to FIGS. 1 and 2, the mobile station 11 comprises a producing circuit 31. Responsive to the end of the detection signal, the producing circuit 31 produces a predetermined coded data signal and a duration signal in a manner which will shortly be described in more detail. The predetermined coded data signal may be, for example, an area number signal assigned to each service area, or an identification number assigned to each mobile station, and is delivered to the transmitting circuit 14 through a line 32. The duration signal is delivered to the power unit 17 through another line 33. In continuance to the detection signal which ends concurrently at the conclusion of the period $t_2$, the power unit 17 enables the transmitting circuit 14 as depicted in FIG. 2C.

The predetermined coded data signal and the duration signal are produced during a third predetermined duration $t_3$ which follows the second predetermined period $t_2$. The transmitting circuit 14 is continuously enabled to make the transmissio radio signal carry the predetermined coded data signal subsequent to the coded audio signal. Upon the disappearance of the duration signal, the power unit 17 disables the transmission signal. It will therefore be understood that the transmission circuit 14 is enabled and disabled in dependence upon the detection signal. The transmitting circuit 14 remains disabled until the appearance of the next following detection signal. Inasmuch as the transmitting circuit 14 consumes most of the power of the power unit 17, significant power savings are achieved.

Referring to FIG. 3, the fixed station, indicated as 41, comprises a reception antenna 42 for receiving the reception radio signal. A reproducing circuit 43 reproduces a first reproduction of the coded audio signal and a second reproduction of the predetermined coded data signal in response to the reception radio signal. Although not depicted in detail, the reproducing circuit 43 comprises a high frequency amplifier, an intermediate frequency amplifier, a low frequency amplifier, and a detector, as well known in the art. The first reproduction of the coded audio signal and the second reproduction of the predetermined coded data signal are delivered from the detector to a separating circuit 44 for separating the first and the second reproductions from each other. A discriminating circuit 45 discriminates the second reproduction to deliver a discrimination signal to an output terminal 46. A decoder 47 decodes the first reproduction into a reproduction of the audio signal. A speaker 48 produces the voice in response to the reproduction of the audio signal.

Reviewing FIGS. 1 and 3, it may be mentioned here that a plurality of mobile stations are moving with intermittent stops in the service area of the fixed station 41. The mobile stations are carrying out radio communications with the fixed station 41 by using some of the radio channels assigned to the fixed station 41. For this purpose, a particular mobile station will request the fixed station 41 to provide a call service by going off-hook. The fixed station 41 selects a vacant radio channel and allots this particular channel to the particular mobile station. In the manner described above, the mobile station sends the transmission radio signal to the fixed station 11 through the assigned channel. The fixed station 41 receives the reception radio signal through the assigned channel. The reception radio signal has a certain varying field intensity and a substantially zero field intensity when the mobile station respectively transmits and suspends transmission of the radio signal in the manner described above. The fixed station 41 holds the channel for the particular mobile station throughout pauses, such as $P_x$ (FIG. 2), until the mobile station goes on-hook.

Aside from during pauses, the field intensity may become low when the mobile station moves away from the fixed station 41. It is desirable for effective use of the limited number of radio channels to regard the particular channel in this instance as a vacant radio channel. The second reproduction of the predetermined coded data signal makes it possible to determine in the fixed station 41 whether a decrease in the field intensity of the particular channel results from a pause in the audio signal delivered to the encoder 13 or from the fact that the particular mobile station 11 is far from the fixed station 41.

In addition, two or more fixed stations may have their respective service areas contiguous to one another. A single radio channel may be common to different mobile stations which are moving in different service areas, respectively. Such common use of a single radio channel is helpful for more effective use of the radio channels. In this event, attention is directed to the fact that mutual interference often arises in this single radio channel because of the common use. For example, a transmission radio signal is produced in a certain one of the service areas and may reach an adjacent service area as an undesired transmission radio signal. Such a phenomenon may be called "over reach" and results in the deterioration of speech quality or in crosstalk. Each radio channel would be monitored so as to assure effective use of the radio channels.

Referring more particularly to FIG. 3, the fixed station 41 as described above may be supplemented according to a second embodiment of this invention. The fixed station 41 in this embodiment further comprises a measuring circuit 49 coupled to the reproducing circuit 43 as will presently be described. A monitoring circuit 50 is coupled to both the discriminating circuit 45 and the measuring circuit 49.

As determine in the art, it is possible to know the field intensity of the particular channel by measuring an intermediate frequency signal which is derived from the reception radio signal of the particular channel and which is sent from the above-mentioned intermediate frequency amplifier of the reproducing circuit 43. Under these circumstances, the measuring circuit 49 measures the field intensity of the particular channel in response to the intermediate frequency signal to produce a signal representative of signal strength.

On the other hand, the discriminating circuit 45 produces the discrimination signal when the second reproduction of the predetermined coded data signal is sent from the separating circuit 44. Inasmuch as the second reproduction appears next to the first reproduction of the coded audio signal, the discrimination signal specifies a beginning of each pause.

Responsive to the discrimination signal, the monitoring circuit 50 is put into an active state so as to receive the result signal from the measuring circuit 49. Thus, the monitoring circuit 50 monitors the field intensity of the specific radio channel during each pause. When the field intensity becomes large in comparison with a predetermined threshold level, the monitoring circuit 50 regards the particular channel as subjected to mutual interference and places a controller 51 in an active state. The controller 51 switches the particular channel to another channel in a known manner.

The controller 51 is also operable to hold the particular channel during each pause as long as the occurrence of mutual interference is not indicated by the monitoring circuit 50, like in the first embodiment. The controller 51 serves to process the discrimination signal in cooperation with the monitoring circuit 50.

Thus, the illustrated fixed station 41 enables the effective use of the limited number of the radio channels and can avoid mutual interference.

While this invention has so far been described in conjunction with two preferred embodiments thereof, it is readily possible for those skilled in the art to put this invention into practice in various other manners. For example, the transmitting circuit may produce an additional coded data signal preceding the coded audio signal. The combination of the predetermined coded data signal and the additional coded data signal serves to discriminate between an audio signal duration and an interruption duration for each coded audio signal and each pause, respectively. The modulation carried out in the transmitting circuit 14 may be amplitude modulation, frequency modulation, or the like. It is preferable to avoid disturbance between the coded audio signal and each of the predetermined and the additional coded data signals. Therefore, each of the predetermined and the additional coded data signals should be low in magnitude and short in duration so that the audio signal is not disturbed. Each coded signal may be a multiple frequency signal.

What is claimed is:

1. A radio communication system for use in carrying out communications between a mobile station and a fixed station through an assigned radio channel, comprising:
   a mobile station;
   a fixed station;
   said mobile station and said fixed station transmitting and receiving a transmission and a reception radio signal, sid mobile station being of a voice actuated type and comprising a transmitting circuit for generating said transmission radio signal, means for producing a succession of audio signals and for directing said signals to said transmitter circuit with a pause between adjacent ones of said audio signals, detecting means for detecting said audio signals and for producing a detection signal which lasts during the presence of each said audio signal and has a beginning and an end;
   enabling means coupled to said detecting means for enabling said transmitting circuit in response to said detection signal;
   processing means located at said fixed station for processing said reception radio signal into a first reproduction of said audio signal;
   said mobile station further comprising:
   producing means responsive to said detection signal for producing, upon the end of said detection signal, a duration signal and a predetermined coded data signal representing the continuance of said audio signal succession and indicating said pause, and for providing said coded data signal to said transmitting circuit and said duration signal to said enabling means, whereby said enabling means continues to enable said transmitting circuit, even in the absence of said audio signal, to further generate said transmission radio signal modulated by said predetermined coded data signal; and
   said processing means comprising:
   reproducing means responsive to said reception radio signal for reproducing said first reproduction of said audio signal and a second reproduction of said predetermined coded data signal; and
   separating means for separating said second reproduction from said first reproduction, and means for holding said assigned radio channel during said pause in response to said second reproduction.

2. A radio communication system as claimed in claim 1, wherein said producing means is responsive to said detection signal for further producing an additional coded data signal in response to said beginning of said detection signal, and delivering said additional coded data signal as an input to said transmitting circuit to make said radio signal further carry said additional coded data signal.

3. A radio communication system as claimed in claim 1, wherein said fixed station further comprises measuring means coupled to said reproducing means and said separating means for measuring a field intensity of said reception radio signal after said second reproduction.

4. A voice actuated mobile radio transmitter station, comprising:
   a transmitting circuit for transmitting a radio signal via an assigned radio channel, means for producing a succession of audio signals and for applying said signals to said transmitting circuit with a pause left between adjacent ones of said audio signals, detecting means for detecting said audio signals and for producing a detection signal which lasts during the presence of each of said audio signals and which has a beginning and an end, enabling means responsive to said detection signal for enabling said transmitting circuit to modulate said radio signal using said audio signal;
   producing means responsive to said detection signal for producing, after the end of said detection signal, a duration signal and a coded data signal representing the continuance of said audio signal succession and indicating said pause, and for providing said coded data signal to said transmitting circuit and said duration signal to said enabling means, whereby said enalbing means continues to enable said transmitting circuit event in the absence of said audio signal, to further generate said transmission radio signal modulated by said predetermined coded data signal.

5. A mobile station as claimed in claim 4, wherein said producing means is responsive to said detection signal for further producing an additional coded data signal in response to said beginning of said detection signal and delivering said additional coded data signal as an input to said transmitting means to make said radio signal further carry said additional coded data signal.

6. A fixed radio receiver station; comprising; means for receiving a reception radio signal transmitted via an assigned radio channel and which carries an audio signal and a predetermined coded data signal specifying a pause appearing in said audio signal, reproducing means responsive to said reception radio signal for reproducing said reception radio signal as a combination of a first reproduction of said audio signal and a second reproduction of said predetermined coded data signal, and separating means responsive to said combination of the first and the second reproductions for separating said second reproduction of the predetermined coded data signal from said first reproduction of the audio signal, wherein said fixed station further comprises measuring means responsive to said reception radio signal and said second reproduction of the predetermined coded data signal for measuring a field intensity of said reception radio signal after said second reproduction; and means for holding said assigned radio channel during said pause at least for a duration of said second reproduction.

* * * * *

UNITED STATES PATENT AND TRADEMARK OFFICE
CERTIFICATE OF CORRECTION

PATENT NO. : 4,776,034
DATED : October 4, 1988
INVENTOR(S) : Yoshitake Matsuo

It is certified that error appears in the above-identified patent and that said Letters Patent is hereby corrected as shown below:

COLUMN 1, LINE 23    Delete "statio" insert --station--;

COLUMN 3, LINES 40-41    After "ends" delete "concurrently";

COLUMN 3, LINE 48    Delete "transmissio" and insert --transmission --.

Signed and Sealed this

Fourteenth Day of March, 1989

Attest:

DONALD J. QUIGG

Attesting Officer

Commissioner of Patents and Trademarks